Patented May 28, 1946

2,400,873

UNITED STATES PATENT OFFICE 2,400,873

DIHYDRONORDICYCLOPENTADIENYL ETHERS OF HYDROXYCARBOXYLIC ACID ESTERS

Herman A. Bruson, Philadelphia, Pa., assignor to The Resinous Products & Chemical Company, Philadelphia, Pa., a corporation of Delaware No Drawing. Application March 25, 1944,
Serial No. 528,168

11 Claims. (Cl. 260—410.9)

This invention relates to addition-rearrangement products of hydroxycarboxylic acid esters and dicyclopentadiene, said products being dihydronordicyclopentadienyl ethers of hydroxycarboxylic acid esters.

It is already known that certain ethers are obtained when dihydro-α-dicyclopentadiene is boiled with alcohols in the presence of selenious acid as an oxidizing agent (Alder and Stein, Liebig's Annalen der Chemie, 504, pages 207–209 (1933)). These known ethers are derivatives of dihydro-α-dicyclopentadiene-ol-3 and are formed as follows:

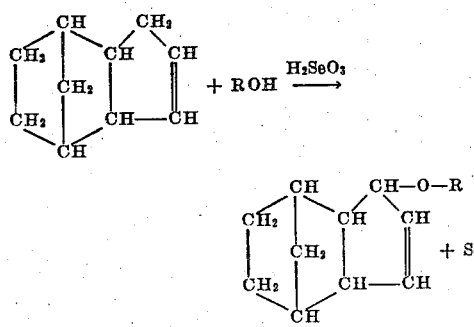

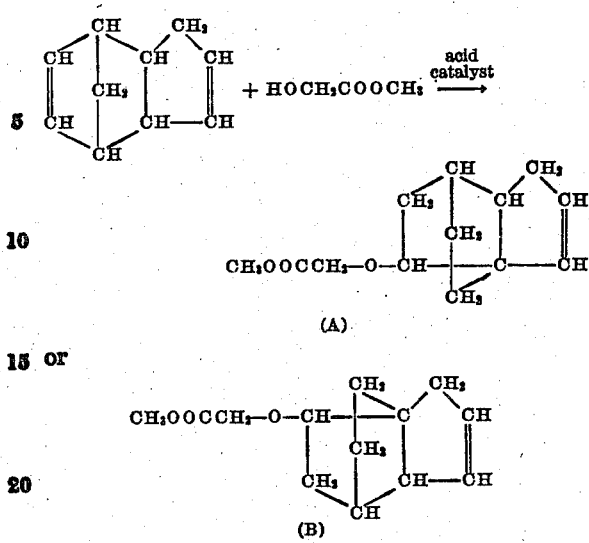

In accordance with the present invention, however, instead of the dihydro derivative being used as the starting material, dicyclopentadiene itself is reacted in the presence of a non-oxidizing acidic condensing agent, such as sulfuric acid or boron trifluoride, with a hydroxycarboxylic acid ester whereby addition of the hydroxyl group of the hydroxycarboxylic ester across the double bond of the bridged endomethylene cycle of the dicyclopentadiene occurs with a simultaneous molecular rearrangement of the latter to a hitherto unknown polycyclic ring system which, for the sake of brevity, is herein termed the "nordicyclopentadiene" ring system to distinguish it from the dicyclopentadiene ring system which is its precursor. The product obtained is a dihydronordicyclopentadienyl ether of a hydroxycarboxylic acid ester and is formed in accordance with the following equation (using methyl hydroxyacetate as the simplest hydroxycarboxylic ester), Formula A or B representing the constitution of the product, A being the more probable of these:

It will be seen that the new ethers obtained according to the present invention differ from the known type in being formed by direct addition of the ester through the hydroxyl group across the double bond without the loss of a hydrogen atom from the dicyclopentadiene nucleous, in the ether group being attached to a different ring of the cyclic system, and in having been completely transformed into a new ring system, namely, the "dihydronordicyclopentadienyl" ring system as represented in Formula A or B. It will also be noted that in the dihydronordicyclopentadienyl ethers obtained according to this invention, the ether oxygen atom is attached to the ring system through a —CH— group flanked on one side by a —CH₂— group and on the other by a tertiary carbon atom, whereas in the previously known ethers of dihydrocyclopentadiene-ol-3 the ether oxygen atom is attached to a —CH— group flanked by two secondary —CH— groups, arrangements conferring entirely different chemical and physical properties to the respective ethers.

A most important chemical property of the new ethers produced according to the present invention is their unique tendency to absorb oxygen from the air. This property is even more accentuated when the carboxyl group of the hydroxy esters is esterified with either unsaturated alcohols or polyhydric alcohols, the new dihydronordicyclopentadienyl ethers of hydroxycarboxylic esters thus obtained being useful as synthetic drying oils.

Instead of methyl hydroxyacetate as shown above, other hydroxycarboxylic acid esters may be used for the purposes of this invention. They may be monohydric or polyhydric in character and may contain more than one esterified carboxyl group. Their acyl group may be aliphatic, arylaliphatic, cycloaliphatic, aromatic, or heterocyclic in character. Their carboxyl group may be esterified with any aliphatic, aromatic, alicyclic, or heterocyclic radical. Typical readily available hydroxycarboxylic acid esters which may be used include, for example, the methyl, ethyl, allyl, butyl, octyl, benzyl, glycol, glyceryl, cyclohexyl, or tetrahydrofurfuryl alcohol esters of hydroxyacetic, lactic, β-hydroxypropionic, α-hydroxyisobutyric, malic, tartaric, ricinoleic, hydroxystearic, dihydroxystearic, mandelic, para-hydroxybenzoic, benzilic, and cyclohexanol carboxylic acids.

Among the acidic condensing agents or catalysts which serve to promote the addition-rearrangement reaction are boron trifluoride and its coordination complexes with oxygenated compounds, sulfuric acid, its acid esters such as ethyl acid sulfate, aromatic sulfonic acids such as toluene sulfonic acid, aliphatic sulfonic acids such as butyl sulfonic acid, acidic salts such as zinc chloride, stannic chloride, titanium tetrachloride, antimonic chloride, aluminum chloride, ferric chloride, acidic siliceous clays such as those sold under the trade names of "Tonsil" or "Atapulgas," etc.

As examples of the coordination complexes of boron trifluoride, there may be cited those with ethers, typified by

BF₃.C₂H₅OC₂H₅ and BF₃.C₄H₉OC₄H₉ with carboxylic acids, typified by

BF₃.2CH₃COOH with carboxylic esters, typified by

BF₃.2CH₃COOC₂H₅ with ketones, typified by BF₃.CH₃COCH₃; with alcohols, typified by BF₃.2C₄H₉OH, and with water, which may be represented by BF₃.(H₂O)ₓ, x being usually one or two.

The preferred catalysts are sulfuric acid and boron trifluoride or its coordination complexes. It is surprising to note that, though even in traces these catalysts promote polymerization of monomeric cyclopentadiene to resins in the absence of an alcohol, and also polymerize unsaturated ethers in general, they do neither to any appreciable degree in the case of a mixture of dicyclopentadiene and the hydroxycarboxylic acid esters as described herein, but on the contrary promote the formation of highly reactive and useful unsaturated ethers by an addition-rearrangement reaction.

The quantity of active catalyst employed may be varied over a wide range. Good results have been obtained with as little as ½% to 5% of catalyst on the weight of the reactants being used, but additional quantities of catalyst are similarly effective. The catalyst need not be used under anhydrous conditions. In fact, the presence of water in small amounts often increases the rate of the reaction.

The quantity of dicyclopentadiene used is advantageously one mol per mol of hydroxycar-  boxylic acid ester, but other proportions may be used in the reaction mixture.

The addition-rearrangement reaction may be initiated by mixing the components and catalyst at temperatures even as low as 0° C. in some cases, or at room temperature, or at elevated temperatures. While it is generally desirable to control the temperature at the start, the reaction may be accelerated or carried to completion more rapidly by continuing the reaction for a long time or by raising the temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally useful, the best working range being 95° to 125° C. The reaction may be controlled by the rate of mixing the reactants and by the use of a solvent or diluent, such as a hydrocarbon solvent, including petroleum ethers or petroleum naphthas, or chlorinated hydrocarbons such as carbon tetrachloride, ethylene dichloride, tetrachlorethane, and the like.

After the reaction has been carried to the desired point, the acidic condensing agent is removed as by washing with water or neutralization with an alkali, or both. The reaction product may then be distilled in many cases or otherwise purified, as by treatment with decolorizing clay or carbon, stripping, extraction, etc.

The following examples illustrate this invention, it being understood that the term "dihydronordicyclopentadienyl" refers to the new polycyclic radical, C₁₀H₁₃—, represented by one of the isomeric forms (A) or (B):

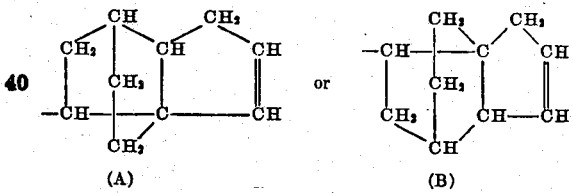

(A)    (B)

wherein the added group is attached to an endoethylene cyclopentano group forming one terminal cycle and a five-membered ring containing an olefinic linkage forming the opposite terminal cycle of said dihydronordicyclopentadienyl radical. The group may, therefore, be summarized by the structural formula

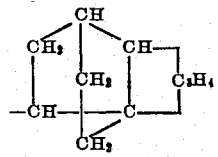

wherein C₃H₄ is a propenylene group which in conjunction with the adjoining carbon atoms forms a cyclopenteno group.

The most important ether esters obtained according to this invention possess the formula:

C₁₀H₁₃—O—A—COOR wherein C₁₀H₁₃ is the dihydronordicyclopentadienyl radical, A is a divalent aliphatic hydrocarbon radical, and R is the non-hydroxylated portion of an organic alcohol. These new ether esters are of value as plasticizers, as resin-forming compounds, and as intermediates for the preparation of plastics. Upon saponification, they yield the corresponding ether acids:

C₁₀H₁₃—O—A—COOH which are of value as plant hormones, substitutes for naphthenic acids for the preparation of their fungicidal copper and mercury salts and of siccatives for varnishes, etc.

When R is an unsaturated hydrocarbon group, such as allyl, or a glycol or glyceryl radical, these new ether esters may be used as synthetic drying oils.

Example 1

To a stirred mixture of 118 grams of ethyl lactate and 132 grams of dicyclopentadiene at 50° C., there was gradually added 25 grams of boron trifluoride-diethyl ether, $BF_3.O(C_2H_5)_2$. The mixture was stirred for four and one-quarter hours thereafter at 60° C. It was then cooled, washed twice with cold water, taken up in toluene, washed with cold soda solution, then again with water, and the toluene evaporated in vacuo. The residual oil (203 grams) was distilled at 125°–142° C. at 2 mm. as a colorless oil. Upon redistillation, the cut boiling at 125°–128° C./2 mm. possessed the following constants: $N_D^{25}$ 1.4823; $d_4^{25}$ 1.050; saponification number, 219 (theory, 224). Analysis indicated it to have the formula:

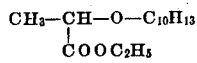

Upon saponification, it yields the corresponding (dihydronordicyclopentadienyl)-oxypropionic acid,

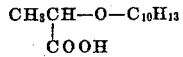

a colorless oil boiling at 150°–155° C. at 2 mm., the copper salt of which is useful as a fungicide and mildewproofing agent.

Example 2

To a stirred solution of 104 grams of ethyl hydroxyacetate and 132 grams of dicyclopentadiene at 50° C., there was added dropwise 25 grams of $BF_3.O(C_2H_5)_2$. The mixture was stirred for five hours at 60° C., then cooled, washed with cold water, with soda solution, with water again, and then dried and distilled in vacuo. The dihydronordicyclopentadienyl ether of the formula:

distilled at 150°–160° C./5 mm. as a pale yellow oil in a yield of 80 grams. Upon redistillation, it came over as a colorless oil boiling at 134°–136° C./1.5 mm. and having the following constants: $N_D^{25}$ 1.4920; $d_4^{25}$ 1.0871; saponification number, 240 (theory, 237); iodine number, 111 (theory, 108). Upon hydrolysis, it yields the corresponding (dihydronordicyclopentadienyl)-oxyacetic acid,

the lead, cobalt, and manganese salts of which are oil-soluble compounds useful as siccatives in varnishes.

Example 3

A mixture of 132 grams of ethyl-α-hydroxyisobutyrate and 132 grams of dicyclopentadiene was stirred at 50° C. and 25 grams of

was added dropwise. The mixture was stirred at 50°–60° C. for three and one-half hours. It was cooled, mixed with an equal volume of toluene, washed thoroughly with water, with soda solution, and with water again, then dried and distilled in vacuo.

The (dihydronordicyclopentadienyl)-oxyisobutyric acid ethyl ester,

distilled over at 131°–134° C./3 mm. as a colorless oil possessing the following constants: $N_D^{25}$ 1.4799; $d_4^{25}$ 1.033; saponification number, 214 (theory, 213).

Example 4

A mixture of 164 grams of ethyl-12-hydroxystearate (from hydrogenation of ethyl ricinoleate) and 66 grams of dicyclopentadiene was heated with 20 grams of $BF_3.O(C_2H_5)_2$ for five and one-half hours at 80°–85° C. After the reaction mixture was washed, neutralized, washed again, and dried, the product was distilled in vacuo. The carbethoxy octadecyloxydihydronordicyclopentadiene,

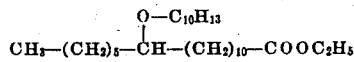

boiled at 255°–260° C./2 mm., the yield being 56 grams. It was a pale yellow oil having a saponification number of 124 (theory, 122).

Example 5

To a stirred mixture of 186 grams of castor oil (0.2 mol) and 79.2 grams of dicyclopentadiene (0.6 mol), there was added 10 grams of

and the mixture heated at 90° C. for five hours. The dark viscous mass was then cooled, taken up in toluene, washed twice with water, then with soda solution, and finally with water. It was then heated in vacuo to remove the solvent and, finally, at 200° C. at about 2 mm. to remove all low-boiling material. The residual product weighed 261 grams and consisted of a viscous dark oil which, in contrast to castor oil, was readily soluble in kerosene or in mineral oil.

The product is chiefly the tri-(dihydronordicyclopentadienyl) ether of ricinoleic acid triglyceride:

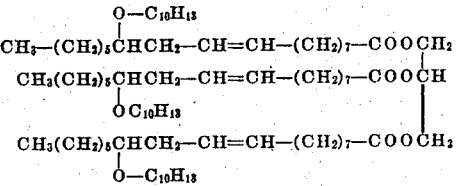

By using 0.2 mol of dicyclopentadiene instead of 0.6 mol as above, the corresponding mono-(dihydronordicyclopentadienyl) ether of ricinoleic triglyceride is obtained as a thick oil. Similarly, by using 0.4 mol of dicyclopentadiene instead of 0.6 mol as above, the di-(dihydronordicyclopentadienyl) ether of ricinoleic triglyceride is chiefly formed.

Example 6

To a stirred solution of 106 grams of dicyclopentadiene and 76 grams of methyl-para-hydroxybenzoate heated to 95° C., there was gradually added seven grams of a 10% solution of boron trifluoride in di-n-butyl ether. The temperature rose rapidly to 155° C., whereupon the mixture was cooled and stirred for twenty-five minutes until the temperature had fallen to 55° C. The viscous dark mass was taken up in ethylene dichloride, washed with dilute sodium hydroxide solution, then with water, dried, and distilled in vacuo.

The product boiling at 195°–210° C./2 mm. came over as a viscous pale yellow oil in a yield of 95 grams, which rapidly crystallized to a solid mass. Upon recrystallization from petroleum ether, the p-(dihydronordicyclopentadienyl) oxybenzoic acid methyl ester,

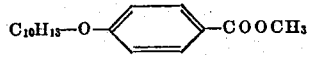

formed colorless crystals melting at 68°–69° C.

*Example 7*

A mixture consisting of 312 grams of methyl ricinoleate, 140 grams of dicyclopentadiene, and 15 grams of boron trifluoride-di-n-butyl ether, $BF_3.O(C_4H_9)_2$ was stirred at 95°–105° C. for one and three-quarter hours and then at 110°–120° C. for six and one-quarter hours. The product was cooled, washed with dilute sodium carbonate solution, then with water, dried, and distilled in vacuo. The dihydronordicyclopentadienyl ether of methyl ricinoleate,

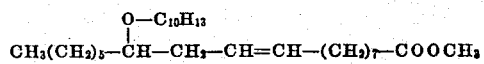

distilled over between 250° and 260° C./2 mm. as a pale yellow oil in a yield of 135 grams.

Upon saponification with aqueous sodium hydroxide and acidification of the soap obtained, the free dihydronordicyclopentadienyl oxy-oleic acid,

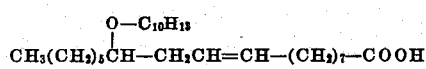

is obtained as a pale yellow oil. The glycerol triester or the glycol diester of this acid possesses air-drying properties.

*Example 8*

Five grams of boron trifluoride-di-n-butyl ether, $BF_3.O(C_4H_9)_2$, was added to a stirred, heated mixture of 104 grams of n-butyl mandelate and 79 grams of dicyclopentadiene at 75° C. The mixture was stirred and heated gradually to 90° C. during the course of thirty minutes and finally heated at 90° C. for two hours. The product was cooled, washed with dilute soda solution and with water, and dried in vacuo on 100° C. The residual black oil weighed 183 grams. Upon distillation in vacuo, this oil yielded 128 grams of a fraction boiling at 195°–215° C./2 mm. as a colorless liquid having the formula:

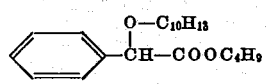

wherein $C_{10}H_{13}$— is the dihydronordicyclopentadienyl group. The pure compound boils at 183° C./1.5 mm.

*Example 9*

To 212 grams of 85% lactic acid, 20 grams of 98% sulfuric acid was added gradually with cooling. Dicyclopentadiene (132 grams) was then added. The mixture was stirred and gradually heated under a reflux condenser on a steam bath. An exothermal reaction occurred which raised the temperature to about 113° C. When this reaction had subsided, the mixture was stirred continuously for three hours at 95° C. It was then cooled, washed with water, and the oil layer separated. The oil was taken up in toluene and the toluene solution shaken with powdered calcium hydroxide to destroy any residual acidity. The filtered solution was then distilled in vacuo to yield the lactate of hydroxydihydronordicyclopentadiene,

as a colorless liquid boiling at 150°–155° C./8 mm.

To a stirred solution of 66 grams of dicyclopentadiene and 111 grams of the above dihydronordicyclopentadienyl lactate at 75° C., there was added gradually five grams of $BF_3.O(C_2H_5)_2$ and the mixture heated at 90° C. for two hours. The product was cooled, washed with dilute soda solution, taken up in toluene, washed, dried, and distilled in vacuo. The dihydronordicyclopentadienyl ether of the dihydronordicyclopentadienyl lactate having the formula:

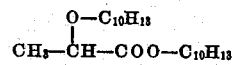

distilled over at 205°–220° C./1–2 mm. as a very viscous pale yellow oil. It possesses drying properties and may be used as a substitute for natural drying oils.

When mixed, for example, with lead, cobalt, and manganese naphthenate to give a solution containing 0.5% of lead, 0.05% of manganese, and 0.02% of cobalt on the weight of the oil, a clear varnish is obtained. When a film of this varnish is baked on steel at 150° C. for ninety minutes, a tough, hard, adherent, mar-proof coating is obtained.

This application is a continuation-in-part of copending application Serial No. 476,640, filed February 20, 1943.

I claim:

1. An acid-catalyzed addition-rearrangement product of dicyclopentadiene and a hydroxycarboxylic acid ester, said product being a dihydronordicyclopentadienyl ether of the hydroxycarboxylic acid ester.

2. An acid-catalyzed addition-rearrangement product of dicyclopentadiene and an aliphatic hydroxycarboxylic acid ester, said product being a dihydronordicyclopentadienyl ether of the aliphatic hydroxycarboxylic acid ester.

3. An acid-catalyzed addition-rearrangement product of dicyclopentadiene and an aliphatic hydroxycarboxylic acid ester, said product having the formula:

$$C_{10}H_{13}—O—A—COO—R$$

wherein $C_{10}H_{13}$ is the dihydronordicyclopentadienyl radical, —A— is an alkylene group, and R is an alkyl group.

4. An acid-catalyzed addition-rearrangement product of ethyl lactate and dicyclopentadiene having the formula:

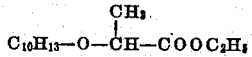

wherein $C_{10}H_{13}$— is the dihydronordicyclopentadienyl radical.

5. An acid-catalyzed addition-rearrangement product of ethyl hydroxyacetate and dicyclopentadiene having the formula:

$$C_{10}H_{13}—O—CH_2COOC_2H_5$$

wherein $C_{10}H_{13}$ is the dihydronordicyclopentadienyl radical.

6. An acid-catalyzed addition-rearrangement product of ethyl-12-hydroxystearate and dicyclopentadiene having the formula:

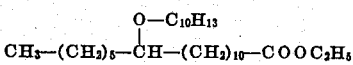

wherein $C_{10}H_{13}$ is the dihydronordicyclopentadienyl radical.

7. A method for preparing an addition-rearrangement product of dicyclopentadiene and a hydroxycarboxylic acid ester, said product being a dihydronordicyclopentadienyl ether of the hydroxycarboxylic acid ester, which comprises reacting dicyclopentadiene with a hydroxycarboxylic acid ester in the presence of an acidic condensing agent.

8. A method for preparing an addition-rearrangement product of dicyclopentadiene and a hydroxycarboxylic acid ester, said product being a dihydronordicyclopentadienyl ether of the hydroxycarboxylic acid ester, which comprises reacting dicyclopentadiene with a hydroxycarboxylic acid ester in the presence of the boron trifluoride catalyst.

9. A method for preparing an addition-rearrangement product of dicyclopentadiene and ethyl lactate, said product being a dihydronordicyclopentadienyl ether of ethyl lactate, which comprises reacting dicyclopentadiene with ethyl lactate in the presence of a boron trifluoride catalyst.

10. A method for preparing an addition-rearrangement product of dicyclopentadiene and ethyl hydroxyacetate, said product being a dihydronordicyclopentadienyl ether of ethyl hydroxyacetate, which comprises reacting dicyclopentadiene with ethyl hydroxyacetate in the presence of a boron trifluoride catalyst.

11. A method for preparing an addition-rearrangement product of dicyclopentadiene and ethyl-12-hydroxy stearate, said product being a dihydronordicyclopentadienyl ether of ethyl-12-hydroxystearate, which comprises reacting dicyclopentadiene with ethyl-12-hydroxystearate in the presence of a boron trifluoride catalyst.

HERMAN A. BRUSON.